United States Patent
Becker et al.

(10) Patent No.: US 9,069,832 B2
(45) Date of Patent: Jun. 30, 2015

(54) APPROACH FOR MODULARIZED SYCHRONIZATION AND MEMORY MANAGEMENT

(71) Applicants: Philipp Becker, Walldorf (DE); Markus Eble, Walldorf (DE); Tobias Elfner, Walldorf (DE); Ivan Galkin, Walldorf (DE); Vaidas Gasiunas, Walldorf (DE); Arne Harren, Walldorf (DE); Maciej Kabala, Walldorf (DE); Klaus Kretzschmar, Walldorf (DE)

(72) Inventors: Philipp Becker, Walldorf (DE); Markus Eble, Walldorf (DE); Tobias Elfner, Walldorf (DE); Ivan Galkin, Walldorf (DE); Vaidas Gasiunas, Walldorf (DE); Arne Harren, Walldorf (DE); Maciej Kabala, Walldorf (DE); Klaus Kretzschmar, Walldorf (DE)

(73) Assignee: SAP AG, Walldorf (DE)

( * ) Notice: Subject to any disclaimer, the term of this patent is extended or adjusted under 35 U.S.C. 154(b) by 193 days.

(21) Appl. No.: 13/725,972

(22) Filed: Dec. 21, 2012

(65) Prior Publication Data

US 2014/0181024 A1 Jun. 26, 2014

(51) Int. Cl.
  *G06F 17/00* (2006.01)
  *G06F 17/30* (2006.01)
(52) U.S. Cl.
  CPC ............................ *G06F 17/30575* (2013.01)

(58) Field of Classification Search
  CPC ................... G06F 17/30067; G06F 17/30575
  USPC .......................................... 707/634, 635, 636
  See application file for complete search history.

(56) References Cited

U.S. PATENT DOCUMENTS 7,882,505 B2 * 2/2011 Garthwaite et al. .......... 718/104
2004/0015912 A1 * 1/2004 Bottomley .................... 717/148

OTHER PUBLICATIONS

Bush et al, "A Static Analyzer for Finding Dynamic Programming Errors", Copyright 2000 John Wiley & Sons, Ltd, pp. 775-802.*
Hovemeyer et al, "Finding Bugs is Easy", OOPSLA'04, Oct. 24-28, 2004, Vancouver; British Columbia, Canada. pp. 92-106.*

* cited by examiner

*Primary Examiner* — Rehana Perveen
*Assistant Examiner* — Loc Tran
(74) *Attorney, Agent, or Firm* — Mintz Levin Cohn Ferris Glovsky and Popeo, P.C.

(57) ABSTRACT

Approaches to memory management and synchronization are described relating to provision of highly robust and highly available servers that can serve multiple requests in parallel. Programming objects can be analyzed at design time by comparison to predefined patterns to identify a set of requirements and rules that must be followed to ensure that all part of a program cooperate. In highly complex programming environments, enforcement of such rules for a program as a whole can be quite difficult. As such, analysis of compliance can desirably occur at a programming object level.

17 Claims, 4 Drawing Sheets

| Owner / Owned | Thread Owned | Bootstrap | Monitor | Monitor Owned |
|---|---|---|---|---|
| Thread Owned | X | X | | |
| Bootstrap | X | X | | |
| Monitor | | | X | X |
| Monitor Owned | | | X | X |

FIG. 2

| Memory / Synchronization | Thread Owned | Bootstrap | Monitor | Monitor Owned |
|---|---|---|---|---|
| Value | Value | | | |
| Temp | LocalTemp | | | |
| Owned | Local | Bootstrap | Global | Global Owned |
| Refcounted | | Local Bootstrap Root | | |
| Immortal | | Global Bootstrap Root | | |
| Stack | Stack | | | |

APPROACH FOR MODULARIZED SYCHRONIZATION AND MEMORY MANAGEMENT

TECHNICAL FIELD

The subject matter described herein relates to synchronization processes and approaches in databases database management systems, and other server applications that have high reliability requirements.

BACKGROUND

Thread safety can be an important concern in database processing operations and also in any kind of server application in which high availability and data integrity are desirable. In general, a thread is the smallest sequence of programmed instructions that can be managed independently by an operating system scheduler. For example, avoidance of race conditions and deadlocks can be desirable, as can ensuring a consistent state after an error rollback, avoidance of synchronization bottlenecks, and the like. As used herein, the term database can refer generally to any of a relational database, a data cube, a column store database, a row store database, data stored on one or more tables or other data structures, or the like.

A race condition can occur when two or more programs (or independent parts of a single program) or programming objects attempt to acquire or otherwise take ownership of the same resource at the same time, resulting in an incorrect answer or conflict. The resource can include information, such as for example a next available appointment time, etc., or it can include exclusive access to an entity, such as for example a database table, one or more records, or the like. As used herein, a programming object represents a programming concept using data fields or attributes that define the object and associated procedures (also referred to as methods). Programming objects can interact with one another to design applications and computer programs.

A deadlock can occur in multiprocessing systems, parallel computing and distributed systems in which software and hardware locks are used to handle shared resources and implement process synchronization. For example, a deadlock can occur when a process enters a waiting state because a resource requested by the process is being held by another waiting process, which in turn is waiting for another resource. If a process is unable to change its state indefinitely because the resource it requested is being used by another waiting process, then the system is said to be in a deadlock.

A database commit occurs when a permanent change is made to a database. For example, when a new row is written to the database, the write operation does not occur until the database commits the change. Rollback is the process of undoing a change to a database. For example, when a new row is written to a table, the write operation can undergo a rollback up to the point at which the write is committed. After the commit, a rollback of the write operation is generally no longer possible.

Synchronization bottlenecks can occur when multiple threads attempt to concurrently update the same programming object (e.g. a C++ object, a C++ class, or other objects or classes of object-based programming languages). It is often possible to eliminate synchronization bottlenecks by replicating programming objects. Each thread can then update its own local replica of the programming object without synchronization and without interacting with other threads. When the original programming object needs to be accessed, the replicas may be combined to produce the correct values in the original programming object. One potential problem is that replicating programming objects may lead to performance degradation and excessive memory consumption.

Proper memory management can also be important. Intelligent memory management and allocation can include one or more of avoidance of memory leaks (including, but not limited to error situations), avoidance of dangling pointers (e.g. memory may not be used after it has been deallocated), memory consumption analysis support, fast memory allocation (e.g. allocation and release of memory in large chunks where possible reduces the cost of allocation), and the like.

Further, as the complexity of a database increases, the number of requests from one or more applications to access programming objects and the potential for violations of one or more thread safety goals also increases.

SUMMARY

In one aspect, a method includes detecting, at design time, a programming object, identifying one or more memory management and synchronization characteristics of the programming object and extracting one or more memory management and synchronization constraints defined at design time for the programming object, matching the programming object to a matching memory management and synchronization pattern, reviewing the extracted one or more memory management and synchronization constraints against a predefined set of constraints associated with the matching memory management and synchronization pattern, and returning an error message if the one or more memory management and synchronization constraints defined for the programming object do not comprise the predefined set of constraints. The programming object includes part of a server application that includes a plurality of other programming objects. The matching includes comparing the one or more identified memory management and synchronization characteristics to a set of predefined memory management and synchronization patterns.

In some variations one or more of the following can optionally be included in any feasible combination. The characteristics can include one or more of an ownership relationship between the programming object and other programming objects and error handling requirements of the programming object. The predefined set of constraints can include rules established to avoid one or more of a race condition, a deadlock, an inconsistent state after an error rollback, a synchronization bottleneck, a dangling pointer, a memory leak, and an allocation bottleneck from occurring when the programming object is executed as part of the server application.

The matching memory management and synchronization pattern can include a thread-owned object pattern such that the programming object is accessible only by one thread, does not require a lock, and the predefined set of constraints include a prohibition on rollback into a consistent state in case of an error that leads to the termination of the one thread. Alternatively or in addition, the matching memory management and synchronization pattern can include a bootstrapped object pattern, such that the programming object is created and initialized within one thread, is set to an immutable state, and is available for read-only access by a plurality of threads in parallel, and the predefined set of constraints includes no requirement for a lock and no requirement for an ability to rollback into a consistent state in case of an error that leads to deletion programming object. Alternatively or in addition, the matching memory management and synchronization pattern can include a monitor object pattern, such that the programming object is accessible by a plurality of threads in parallel, and the predefined set of constraints includes requiring a lock for all public read and write operations and an ability to rollback into a consistent state in case of an error. Alternatively or in addition, the matching memory management and synchronization pattern comprises a monitor-owned object pattern, wherein the programming object is capable of being accessed only through a monitor, and the predefined set of constraints includes requiring an ability to rollback into a consistent state in case of an error, but no requirement for a lock. Alternatively or in addition, the matching memory management and synchronization pattern can include a value memory management pattern such that the programming object includes one or more of a trivial destructor and a copy constructor and does not require an allocator, and the predefined set of constraints includes allowing the programming object to own a value programming object, to be passed by value, and to be accessible only by one thread. Alternatively or in addition, the matching memory management and synchronization pattern can include a temp memory management pattern such that the programming object exists within a limited context in a temp allocator and is suitable for bulk deletion, and the predefined set of constraints includes allowing the programming object to own at least one of another temp programming object and a value programming object, allowing the programming object to be deleted through deletion of the temp allocator without calling a destructor, and allowing the programming object to be accessible by only one thread. Alternatively or in addition, the matching memory management and synchronization pattern can include an owned memory management pattern, such that the programming object has a lifetime controlled by a single owning programming object, and the predefined set of constraints includes requiring an allocator; disallowing the programming object from having a contructor; allowing the programming object to own at least one of another owned programming object, a temp programming object, a value programming object, and a refcounted programming object; and requiring all allocations to be kept in at least one of an autopointer, a smart pointer, and a RefCounted pointer. Alternatively or in addition, the matching memory management and synchronization pattern can include a refcounted memory management pattern, such that the programming object includes a lifetime which ends when all references to the programming object are released, and the predefined set of constraints includes disallowing a copy constructor for the programming object, requiring an allocator for the programming object, and allowing the programming object to own at least one of an owned programming object, a value programming object, and another refcounted programming object. Alternatively or in addition, the matching memory management and synchronization pattern can include an immortal memory management pattern, such that the programming object is created during system startup and not deleted before system shutdown, and the predefined set of constraints includes allowing the programming object to own at least one of an owned programming object, a value programming object, and another immortal programming object. Alternatively or in addition, the matching memory management and synchronization pattern can include a stack memory management pattern, such that the programming object manages access to other programming objects existing in thread local storage, and the predefined set of constraints includes disallowing the programming object from having a copy constructor; and allowing the programming object to own at least one of an owned programming object, a temp programming object, and a value programming object; and allowing the programming object to be accessible by only one thread.

Implementations of the current subject matter can include, but are not limited to, systems and methods including one or more features as described herein as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 shows a table illustrating ownership relationships between different types of synchronization patterns consistent with implementations of the current subject matter;

When practical, similar reference numbers denote similar structures, features, or elements.

DETAILED DESCRIPTION

Figure 1:
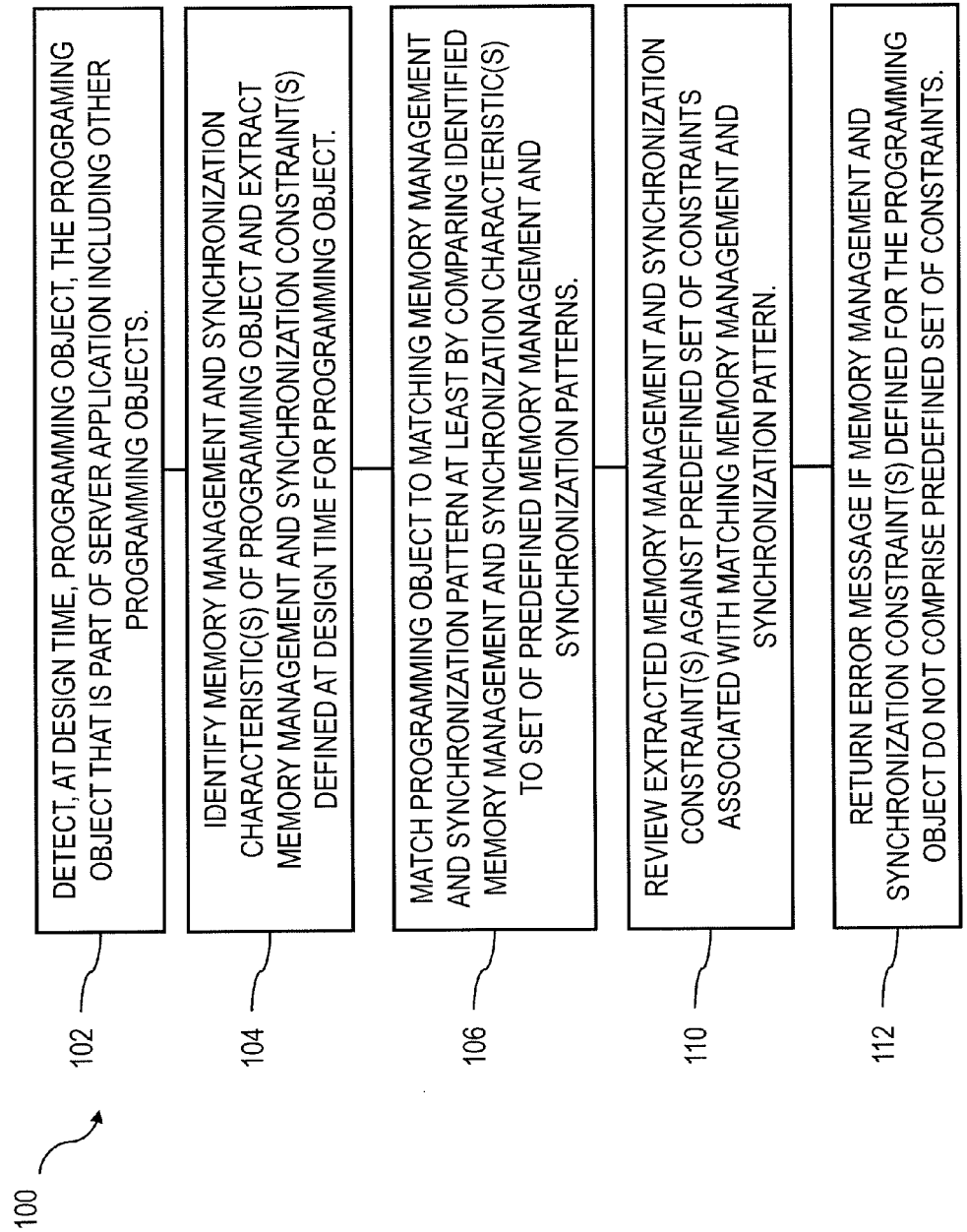
FIG. 1 shows a process flow diagram illustrating aspects of a method having one or more features consistent with implementations of the current subject matter.

Consistent with one or more implementations, the current subject matter can provide a highly robust and highly available server (e.g. a database server) that can serve multiple requests in parallel (maybe a database server). In general, such a server can advantageously ensure that access is synchronized (e.g. no concurrent write access to the same piece of data are allowed), be capable of rolling the state of the server back to the state before an operation started in the event that the operation fails, avoid deadlocks and synchronization bottlenecks (e.g. redundant locks can be avoided by identifying thread-local, bootstrapped or monitor-owned objects, release memory when no longer in use (e.g. minimization or elimination of memory leaks), and prevent memory use (e.g. by a thread) after it has been released (e.g. no dangling pointers are allowed).

To fulfill these requirements, all parts of the program must cooperate. The complexity to fulfill such requirements can increase with the size of the program and the amount of dependencies between the parts of the program. It can be extremely difficult to verify the fulfillment of these requirements for a program as a whole.

As used herein, a lock is a synchronization mechanism for enforcing limits on access to a resource in an environment where there are many threads of execution. Locks are one way of enforcing concurrency control policies, and can be incorporated into one or more isolation approaches. More generally, isolation is a property in defining how and when changes made by one operation in a database become visible to other concurrent operations within the database. Isolation of concurrent transactions can be an important requirement for the correct execution of transactions. Without transactional isolation, concurrent transactions could potentially read an inconsistent intermediate state written by some transactions or a state caused by a transaction that is later aborted (e.g., in a "dirty read"). When attempting to maintain isolation, server application (e.g. a database management system or "DBMS") or other software architecture that provides access to data stored in one or more database or other data tables can implement locks on data or otherwise institute multi-version concurrency control, which can result in a loss of concurrency in some cases. In such a case, additional logic can usually be required for an application to function correctly.

Multi-version concurrency control (MVCC) in a DBMS can ensure consistent read operations. However, it generally cannot prevent concurrent write operations on the same data and the associated inconsistencies that can arise from instances of such events (e.g., a dirty write, a lost update, etc.). To prevent concurrent write operations on the same data record, exclusive write locks can be included as part of DBMS. In some examples, these exclusive write locks can be implemented at a row level. For each write access, a row-level write lock can be obtained. Concurrent transactions attempting to write the same record can thereby be required to wait until the lock is released. Write locks can be implicitly requested before an update or delete operation is executed. Alternatively or in addition, an application accessing a database can explicitly request a row level lock, for example, using the "select for update" SQL statement (SELECT*FROM T WHERE . . . FOR UPDATE).

One or more of the aforementioned issues or other issues can be addressed by various approaches consistent with implementations of the current subject matter. For example, programming objects that are accessible by more than one thread at the same time can be generally required to lock all types of access to their state (e.g., both read and write) during an access. Additionally, actions that must be done with a lock can be advantageously minimized to avoid synchronization bottlenecks. Data structures can also be prevented or at least limited from acquiring more than one lock at any given time (e.g., to avoid a potential deadlock state). Furthermore, calling functions from other components by a first component while the first component is under a lock can also advantageously be avoided (e.g., to avoid potential deadlock states). In this example, it can still be permissible to call basis functions, search engine (e.g. TREX, etc.) functions, or the like.

The requirements noted above can be broken down into rules that can be applied and checked locally on each module of a program. Dependent on its behavior and usage, each module is assigned a synchronization pattern and a memory management pattern. Each such classification of a module with a synchronization pattern and a memory management pattern can include a set of constraints that are applied when the classification is developed. These classifications can also determine how modules can interact with each other. The fulfillment of these constraints can be checked locally by looking at the implementation of a single module (either automatically or locally).

Implementations of the current subject matter can address the types of issues discussed above (e.g. a race condition, a deadlock, an inconsistent state after an error rollback, and a synchronization bottleneck) when the programming object is executed as part of the server application, for example by determining a synchronization pattern applicable to a programming object or class or other kind of programming entity and then applying a set of synchronization rules or constraints to govern access to the programming object. To do so, one or more characteristics of the programming object can be compared to parameters of a defined set of synchronization and memory management patterns. Examples of such patterns are laid out in more detail below. The characteristics in question can generally relate to ownership relationships between a specific programming object and other programming objects as well as to error handling requirements of the programming object.

FIG. 1 shows a process flow diagram 100 illustrating features of a method, at least some of which can optionally be included in implementations of the current subject matter. At 102, a programming object is detected at design time, for example by a check module that checks for thread safety and consistent memory management on a system that includes one or more programmable processors. The programming object includes part of a server application that includes a plurality of other programming objects. At 104, one or more memory management and synchronization characteristics of the programming object are identified and one or more memory management and synchronization constraints defined at design time for the programming object are extracted. The programming object is matched at 106 to at least one matching memory management and synchronization pattern. The matching includes comparing the identified one or more memory management and synchronization characteristics to a set of predefined memory management and synchronization patterns. At 110, the extracted one or more memory management and synchronization constraints defined for the programming object are reviewed against a predefined set of constraints associated with the matching predefined memory management and synchronization pattern. An error message is returned at 112 if the one or more synchronization constraints defined for the programming object do not comprise the predefined set of constraints. The error message can optionally include identification of at least one memory management and synchronization characteristic of the programming object that is inconsistent with the predefined set of constraints associated with the matching predefined memory management and synchronization pattern for the programming object.

Thread-owned programming objects can include programming objects that are accessible only by one thread and generally do not require a lock and do not require the ability to rollback into a consistent state in case an error leads to the termination of the thread. However, such thread-owned programming objects can require an avoidance of memory leaks in case of an error rollback.

Bootstrapped programming objects can include programming objects that are created and initialized within one thread and can be set to immutable and used read-only by multiple threads in parallel. No lock of such bootstrapped programming objects is required, nor is the ability to rollback into a consistent state in case an error leads to deletion of the programming object. However, it can be necessary to avoid memory leaks for such bootstrapped programming objects in case of an error rollback. An immutable flag for such bootstrapped programming objects can also be required.

Monitor programming objects can include programming objects that are accessible by multiple threads in parallel. Such programming objects can require a lock for all public read and write operations and can require the ability to rollback into a consistent state in case an error occurs.

Monitor-owned programming objects can include programming objects that can be accessed only through a monitor (e.g., by the owner monitor or by other programming objects owned by the same monitor). Such programming objects generally do not require a lock consistent with implementations of the current subject matter. However, such programming objects can require the ability to rollback into a consistent state in case an error occurs. In the event of a crash, read access can be provided without a lock provided that consistency of the data is guaranteed. Allocations can be restricted while read access to the programming object is locked such that deadlocks can be eliminated or at least reduced.

FIG. 2 shows a table 200 illustrating ownership relationships between different types of synchronization patterns consistent with implementations of the current subject matter. For the purposes if this disclosure, ownership in a synchronization context can mean that a second object owned by a first can only be accessed through the first object (A) or another object also owned by the first object. In a memory management context, ownership of a second object by a first object implies that the first object is responsible for the lifetime of the second object (e.g. the first object is required to delete the second object when the lifetime of the first object ends). As shown in the table 200, a programming object corresponding to a thread-owned synchronization pattern can own one or more of another programming object corresponding to a thread-owned synchronization pattern and a programming object corresponding to a bootstrap synchronization pattern. A bootstrapped programming object can similarly own one or more of a programming object corresponding to a thread-owned synchronization pattern and another programming object corresponding to a bootstrap synchronization pattern. Monitor objects can own one or more of another object corresponding to a bootstrap synchronization pattern and a programming object corresponding to a bootstrap synchronization pattern. Monitor-owned programming objects can own one or more of a programming object corresponding to a monitor synchronization pattern and another programming object corresponding to a monitor-owned synchronization pattern.

Figure 3:
FIG. 3 shows a table illustrating relationships between different synchronization and memory management patterns consistent with implementations of the current subject matter.

FIG. 3 shows a table 300 illustrating relationships between different synchronization and memory management patterns consistent with implementations of the current subject matter. As shown in the table 300, a thread-owned synchronization pattern can apply to one or more of a value memory management pattern, a local temp memory management pattern, a locally owned memory management pattern, and a stack memory management pattern. A bootstrap synchronization pattern can apply to one or more of a bootstrap owned memory management pattern, a local bootstrap root refcounted memory management pattern, and a glob bootstrap root immortal memory management pattern. Monitor synchronization patterns and monitor-owned synchronization patterns can apply to a globally owned memory management pattern.

The memory management patterns discussed in reference to the table 300 of FIG. 3 can be defined as follows.

According to a "value" memory management pattern, programming objects with one or more of a trivial destructor and copy constructor can require no allocator. For reference, a constructor is a function used to create and/or initialize programming objects of its class type. A destructor is a member of a class or type of data entity that causes removal, deletion, etc. of programming objects of its type. A trivial destructor is one that is implicitly defined and for which all of the direct base classes or types for which the destructor is used also have trivial destructors. A value memory management pattern can own value programming objects, can be passed by value, and can generally be accessible only by one thread.

A "temp" memory management pattern can include programming objects that exist within a limited context and are suitable for bulk deletion. No copy constructor is allowed. Such programming objects generally exist in a temp allocator, and all owned programming objects must live in the same temp allocator. The temp memory management pattern can own both Temp and Value programming objects. Deletion can be performed by deleting the temp allocator without calling a destructor (in case of an error). The temp memory management pattern is also generally accessible only by one thread.

An "owned" memory management pattern can include programming objects whose lifetime is controlled by one owning programming object. No copy constructor is allowed for this memory management pattern, however, an allocator is required. The owned memory management pattern can own owned, temp, value and refcounted programming objects. All allocations (including owned members) generally must be kept in autopointers or smart/RefCounted pointers. For reference, an autopointer can be considered to be a programming object that stores a pointer to a single allocated programming object of a specific programming object type and that ensures that the programming object to which it points gets destroyed automatically when control leaves a given scope.

A "refcounted" memory management pattern can include programming objects with a lifetime which ends when all references to it are released. No copy constructor is allowed for this memory management pattern. However, an allocator can be necessary. A refcounted memory management pattern can own owned, value, and refcounted programming objects. Allocations (including owned members) for the refcounted memory management pattern can be required to be kept in auto-pointer templates. For reference, the term "refcounted" (Reference Counted) refers generally to performing a count of the number of references, pointers, handles, etc. to a resource such as a programming object, block of memory, disk space etc.

An "immortal" memory management pattern can include programming objects created during system startup that are not deleted before system shutdown. No copy constructor is allowed, but an allocator generally is required. An immortal memory management pattern can be a singleton, for example it can restrict the instantiation of a class to one programming object. An immortal memory management pattern can own owned, value and immortal programming objects. Allocations performed after system startup can generally be required to be kept in autopointers, and changes made after system startup can be required to be atomic.

A "stack" memory management pattern can include programming objects owned by a stack frame. No copy constructor is allowed. The stack memory management pattern can manage access to programming objects existing in thread local storage. A stack memory management pattern can own owned, temp and value programming objects. Allocations (including owned members) can, in some implementations of the current subject matter be required to be kept in autopointers. A destructor can generally be required to be called at the end of the lifetime. Stack patterned programming objects, etc. are generally accessible only by one thread.

Figure 4:
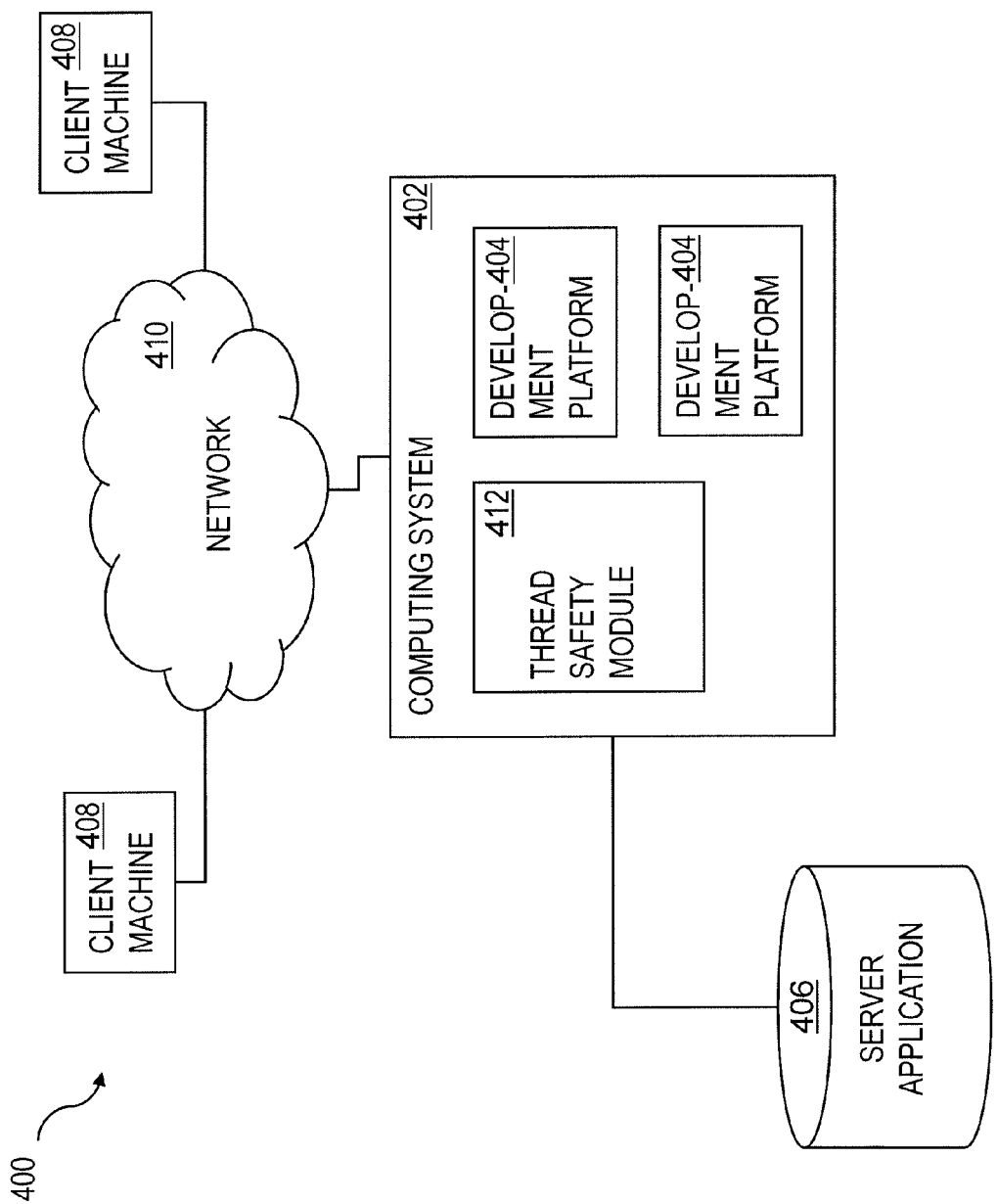
FIG. 4 shows a diagram illustrating features of a business software system architecture consistent with at least some implementations of the current subject matter.

FIG. 4 shows a diagram of a system consistent with one or more implementations of the current subject matter. A computing system 402 can include one or more development modules 404 supporting development of one or more features of a server application 406. The computing system can also aggregate or otherwise provide a gateway via which users can access functionality provided by one or more external software components 406. Client machines 408 can access the computing system 102, either via a direct connection, a local terminal, or over a network 410 (e.g. a local area network, a wide area network, a wireless network, the Internet, or the like). A thread safety module 412 or other comparable functionality can support one or more features as discussed above.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer program product comprising a non-transitory machine-readable medium storing instructions that, when executed by a system comprising at least one programmable processor, cause the system to perform operations comprising:

detecting, at design time, a programming object, the programming object comprising part of a server application that includes a plurality of other programming objects;

identifying one or more memory management and synchronization characteristics of the programming object and extracting one or more memory management and synchronization constraints defined at design time for the programming object;

matching the programming object to a matching memory management and synchronization pattern, the matching comprising comparing the one or more identified memory management and synchronization characteristics to a set of predefined memory management and synchronization patterns;

reviewing the extracted one or more memory management and synchronization constraints against a predefined set of constraints associated with the matching memory management and synchronization pattern; and returning an error message if the one or more memory management and synchronization constraints defined for the programming object do not comprise the predefined set of constraints;

wherein the matching memory management and synchronization pattern is selected from a thread-owned object pattern, a bootstrapped object pattern, a monitor object pattern, a monitor-owned object pattern, a value memory management pattern, a temp memory management pattern, an owned memory management pattern, a refcounted memory management pattern, an immortal memory management pattern, and a stack memory management pattern.

2. A computer program product as in claim 1, wherein the characteristics comprise one or more of an ownership relationship between the programming object and other programming objects and error handling requirements of the programming object; and the predefined set of constraints comprises rules established to avoid one or more of a race condition, a deadlock, an inconsistent state after an error rollback, a synchronization bottleneck, a dangling pointer, a memory leak, and an allocation bottleneck from occurring when the programming object is executed as part of the server application.

3. A computer program product as in claim 1, wherein the matching memory management and synchronization pattern comprises the thread-owned object pattern, wherein the programming object is accessible only by one thread and does not require a lock, and wherein the predefined set of constraints comprises a prohibition on rollback into a consistent state in case of an error that leads to the termination of the one thread.

4. A computer program product as in claim 1, wherein the matching memory management and synchronization pattern comprises the bootstrapped object pattern, wherein the programming object is created and initialized within one thread, is set to an immutable state, and is available for read-only access by a plurality of threads in parallel, and wherein the predefined set of constraints comprises no requirement for a lock and no requirement for an ability to rollback into a consistent state in case of an error that leads to deletion programming object.

5. A computer program product as in claim 1, wherein the matching memory management and synchronization pattern further comprises a monitor object pattern, wherein the programming object is accessible by a plurality of threads in parallel, and wherein the predefined set of constraints comprises requiring a lock for all public read and write operations and an ability to rollback into a consistent state in case of an error.

6. A computer program product as in claim 1, wherein the matching memory management and synchronization pattern comprises the monitor-owned object pattern, wherein the programming object is capable of being accessed only through a monitor, and wherein the predefined set of constraints comprises requiring an ability to rollback into a consistent state in case of an error, but no requirement for a lock.

7. A computer program product as in claim 1, wherein the matching memory management and synchronization pattern comprises the value memory management pattern, wherein the programming object comprises one or more of a trivial destructor and a copy constructor and does not require an allocator, and wherein the predefined set of constraints comprises allowing the programming object to own a value programming object, to be passed by value, and to be accessible only by one thread.

8. A computer program product as in claim 1, wherein the matching memory management and synchronization pattern comprises the temp memory management pattern, wherein the programming object exists within a limited context in a temp allocator and is suitable for bulk deletion, and wherein the predefined set of constraints comprises allowing the programming object to own at least one of another temp programming object and a value programming object, allowing the programming object to be deleted through deletion of the temp allocator without calling a destructor, and allowing the programming object to be accessible by only one thread.

9. A computer program product as in claim 1, wherein the matching memory management and synchronization pattern comprises the owned memory management pattern, wherein the programming object has a lifetime controlled by a single owning programming object, and wherein the predefined set of constraints comprises requiring an allocator; disallowing the programming object from having a contructor; allowing the programming object to own at least one of another owned programming object, a temp programming object, a value programming object, and a refcounted programming object; and requiring all allocations to be kept in at least one of an autopointer, a smart pointer, and a RefCounted pointer.

10. A computer program product as in claim 1, wherein the matching memory management and synchronization pattern comprises the refcounted memory management pattern, wherein the programming object comprises a lifetime which ends when all references to the programming object are released, and wherein the predefined set of constraints comprises disallowing a copy constructor for the programming object, requiring an allocator for the programming object, and allowing the programming object to own at least one of an owned programming object, a value programming object, and another refcounted programming object.

11. A computer program product as in claim 1, wherein the matching memory management and synchronization pattern comprises the immortal memory management pattern, wherein the programming object is created during system startup and not deleted before system shutdown, and wherein the predefined set of constraints comprises allowing the programming object to own at least one of an owned programming object, a value programming object, and another immortal programming object.

12. A computer program product as in claim 1, wherein the matching memory management and synchronization pattern comprises the stack memory management pattern, wherein the programming object manages access to other programming objects existing in thread local storage, and wherein the predefined set of constraints comprises disallowing the programming object from having a copy constructor; and allowing the programming object to own at least one of an owned programming object, a temp programming object, and a value programming object; and allowing the programming object to be accessible by only one thread.

13. A system comprising:
at least one programmable processor; and
a machine-readable medium storing instructions that, when executed by the at least one programmable processor, cause the system to perform operations comprising:
detecting, at design time, a programming object, the programming object comprising part of a server application that includes a plurality of other programming objects;
identifying one or more memory management and synchronization characteristics of the programming object and extracting one or more memory management and synchronization constraints defined at design time for the programming object;

matching the programming object to a matching memory management and synchronization pattern, the matching comprising comparing the one or more identified memory management and synchronization characteristics to a set of predefined memory management and synchronization patterns;

reviewing the extracted one or more memory management and synchronization constraints against a predefined set of constraints associated with the matching memory management and synchronization pattern; and returning an error message if the one or more memory management and synchronization constraints defined for the programming object do not comprise the predefined set of constraints;

wherein the matching memory management and synchronization pattern is selected from a thread-owned object pattern, a bootstrapped object pattern, a monitor object pattern, a monitor-owned object pattern, a value memory management pattern, a temp memory management pattern, an owned memory management pattern, a refcounted memory management pattern, an immortal memory management pattern, and a stack memory management pattern.

14. A system as in claim 13, wherein the characteristics comprise one or more of an ownership relationship between the programming object and other programming objects and error handling requirements of the programming object; and the predefined set of constraints comprises rules established to avoid one or more of a race condition, a deadlock, an inconsistent state after an error rollback, a synchronization bottleneck, a dangling pointer, a memory leak, and an allocation bottleneck from occurring when the programming object is executed as part of the server application.

15. A computer-implemented method comprising:

detecting, at design time, a programming object, the programming object comprising part of a server application that includes a plurality of other programming objects;

identifying one or more memory management and synchronization characteristics of the programming object and extracting one or more memory management and synchronization constraints defined at design time for the programming object;

matching the programming object to a matching memory management and synchronization pattern, the matching comprising comparing the one or more identified memory management and synchronization characteristics to a set of predefined memory management and synchronization patterns;

reviewing the extracted one or more memory management and synchronization constraints against a predefined set of constraints associated with the matching memory management and synchronization pattern; and returning an error message if the one or more memory management and synchronization constraints defined for the programming object do not comprise the predefined set of constraints;

wherein the matching memory management and synchronization pattern is selected from a thread-owned object pattern, a bootstrapped object pattern, a monitor object pattern, a monitor-owned object pattern, a value memory management pattern, a temp memory management pattern, an owned memory management pattern, a refcounted memory management pattern, an immortal memory management pattern, and a stack memory management pattern.

16. A computer-implemented method as in claim 15, wherein the characteristics comprise one or more of an ownership relationship between the programming object and other programming objects and error handling requirements of the programming object; and the predefined set of constraints comprises rules established to avoid one or more of a race condition, a deadlock, an inconsistent state after an error rollback, a synchronization bottleneck, a dangling pointer, a memory leak, and an allocation bottleneck from occurring when the programming object is executed as part of the server application.

17. A computer implemented method as in claim 15, wherein at least one of the detecting, the identifying, the matching, the reviewing, and the returning is performed by a system comprising a programmable processor.

* * * * *